(12) United States Patent
Singh et al.

(10) Patent No.: US 10,885,315 B2
(45) Date of Patent: Jan. 5, 2021

(54) SYSTEMS AND METHODS FOR ALERTING A USER TO PUBLISHED UNDESIRABLE IMAGES DEPICTING THE USER

(71) Applicant: ROVI Guides, Inc., San Jose, CA (US)

(72) Inventors: Gyanveer Singh, Bihar (IN); Charishma Chundi, Andhra Pradesh (IN); Sriram Ponnuswamy, TamilNadu (IN)

(73) Assignee: Rovi Guides, Inc., San Jose, CA (US)

( * ) Notice: Subject to any disclaimer, the term of this patent is extended or adjusted under 35 U.S.C. 154(b) by 177 days.

(21) Appl. No.: 15/924,928

(22) Filed: Mar. 19, 2018

(65) Prior Publication Data
US 2019/0286886 A1    Sep. 19, 2019

(51) Int. Cl.
| G06K 9/00 | (2006.01) |
| H04L 29/08 | (2006.01) |
| G06N 20/00 | (2019.01) |
| H04N 21/454 | (2011.01) |
| H04N 21/488 | (2011.01) |

(52) U.S. Cl.
CPC ..... *G06K 9/00288* (2013.01); *G06K 9/00302* (2013.01); *G06K 9/00684* (2013.01); *G06K 9/00718* (2013.01); *G06N 20/00* (2019.01); *H04L 67/26* (2013.01); *H04N 21/4542* (2013.01); *H04N 21/4882* (2013.01)

(58) Field of Classification Search
CPC ........... G06K 9/00288; G06K 9/00684; G06K 9/00718; G06K 9/00302; G06F 15/18; H04L 67/26
See application file for complete search history.

(56) References Cited

U.S. PATENT DOCUMENTS

| 6,239,794 | B1 | 5/2001 | Yuen et al. |
| 6,564,378 | B1 | 5/2003 | Satterfield et al. |
| 6,959,099 | B2 | 10/2005 | Gutta et al. |
| 7,165,098 | B1 | 1/2007 | Boyer et al. |
| 7,761,892 | B2 | 7/2010 | Ellis et al. |

(Continued)

FOREIGN PATENT DOCUMENTS

WO    WO2015017865    2/2015

OTHER PUBLICATIONS

Birnholtz, et al: "Untagging on social media: Who untags, what do they untag, and why?" 2017. (Year: 2017).*

(Continued)

*Primary Examiner* — Ruiping Li
(74) *Attorney, Agent, or Firm* — Haley Guiliano LLP

(57) ABSTRACT

Systems and methods for warning a user that media assets associated with another user depict the user with an undesired expression are provided. A plurality of media assets associated with a first user and depicting a second user may be identified. A set of expressions of the second user that the second user has indicated as undesirable may be retrieved. The depictions of the second user in the plurality of media assets and the expressions that the second user has indicated are undesirable may be compared. If it is determined that one or more of the media assets depict the second user with an undesirable expression, a notification may be generated to the second user indicating that one or more media assets of the first user depict the second user with an expression that the second user has indicated as undesirable.

20 Claims, 8 Drawing Sheets

(56) References Cited

U.S. PATENT DOCUMENTS

| | | |
|---|---|---|
| 7,809,722 B2 | 10/2010 | Gokturk et al. |
| 8,046,801 B2 | 10/2011 | Ellis et al. |
| 8,180,112 B2 | 5/2012 | Kurtz et al. |
| 2002/0174430 A1 | 11/2002 | Ellis et al. |
| 2003/0108241 A1 | 6/2003 | Colmenarez et al. |
| 2005/0251827 A1 | 11/2005 | Ellis et al. |
| 2007/0282907 A1 | 12/2007 | Chambers |
| 2010/0153885 A1 | 6/2010 | Yates |
| 2012/0027256 A1 | 2/2012 | Kiyohara et al. |
| 2012/0250951 A1 | 10/2012 | Chen |
| 2014/0066018 A1 | 3/2014 | Zhu |
| 2014/0283126 A1* | 9/2014 | Lessin ................ G06F 21/6218 726/28 |

OTHER PUBLICATIONS

Lang et al., "Just untag it: Exploring the management of undesirable Facebook photos," Computer in Human Behavior, 43: 147-155 (2015).

Henne et al. "SnapMe if you can: Privacy threats of other peoples' geo-tagged media and what we can do about it," Security and Privacyn in Wireless and Mobile Networks, ACM, pp. 95-106 (Apr. 17, 2013).

International Search Report and Written Opinion of PCT/US2019/022956 dated Jul. 8, 2019.

* cited by examiner

100

| Media Asset ID | Media Asset Type | Depiction ID | Depiction Data |
|---|---|---|---|
| MA ID #1 | Image | Depiction ID #1 | Depiction Data #1 |
| MA ID #2 | Video | Depiction ID #2 | Depiction Data #2 |
| MA ID #2 | Video | Depiction ID #3 | Depiction Data #3 |
| MA ID #3 | Video | Depiction ID #4 | Depiction Data #4 |

120

| Undesired Depiction ID | Undesired Depiction Data |
|---|---|
| Undesired Depiction ID #1 | Undesired Depiction Data #1 |
| Undesired Depiction ID #2 | Undesired Depiction Data #2 |

FIG. 1

SYSTEMS AND METHODS FOR ALERTING A USER TO PUBLISHED UNDESIRABLE IMAGES DEPICTING THE USER

BACKGROUND

As camera devices have become nearly ubiquitous, the amount of content capturing and depicting users has increased greatly. Particularly with the rise in popularity of social media and photo-sharing platforms, users may be concerned that published content depicting them may be undesirable or unflattering. Current systems enable users to identify other users that are depicted or "tagged" in images and videos that are recorded or uploaded to the Internet. However, users whose depictions are recorded or uploaded may not be aware of that recorded content and where that recorded content is viewable. Furthermore, it may be desirable to inform users of specific content available on the Internet where those users are presented in a specific depiction.

SUMMARY

It would be advantageous to detect when content depicting a user may be undesirable to that user (e.g., a facial expression showing anger, a depiction with a gun in hand, or a depiction of the user in a physical altercation), and to alert the user of the content. Accordingly, systems and methods are disclosed herein for warning a user that media assets associated with another user depict the user with an undesired expression. Specifically, a plurality of media assets associated with a first user may be identified, where each media asset within the plurality of media assets includes a depiction of a second user. A set of expressions of the second user that the second user has indicated as undesirable may be retrieved. It may be determined whether the one or more media assets associated with the first user depict the second user with an expression in the set of expressions that the second user has indicated are undesirable. In response to determining that one or more of the media assets depicts the second user with an undesirable expression, a notification indicating this may be generated for the second user.

In some aspects, a media guidance application may be used to perform the actions necessary to warn a user that media assets associated with another user depict the user with an undesired expression, performing an undesired action, and/or holding an undesired object. The media guidance application may reside on a user's equipment, on a server, or on a combination of those devices. However, these actions may be performed outside of a media guidance application using a combination of hardware and software.

The media guidance application may determine that some of a user's media assets depict another user. Specifically, the media guidance application may determine that each of a plurality of media assets associated with a first user includes a depiction of a second user. For example, the media guidance application may traverse through the camera library of the first user and generate a list of photos and videos in the library that include a depiction of the second user. In some embodiments, the media guidance application may traverse the user's images uploaded to the Internet.

The media guidance application may generate and transmit a request for a list of depictions (e.g., facial expressions) of the second user that the second user finds undesirable. Specifically, the media guidance application may transmit a request, to a remote server, for one or more depiction entries, where each depiction entry represents one or more depictions of the second user that the second user has indicated as undesirable. For example, the media guidance application may send an HTTP GET request containing an identifier of the second user to a remote server that has access to data associated with a group of users.

The media guidance application may receive a response including data on facial expressions of the second user that the second user has indicated are undesirable. Specifically, the media guidance application may receive, in response to the request, a data structure including the one or more depiction entries. For example, the media guidance application may receive a data structure of depiction entries that have been retrieved from a database that resides on the remote server. Each entry may include, for example, a unique depiction identifier, one or more keywords associated with the depiction, and other data.

The media guidance application may attempt to find a match between the media assets depicting the second user and the expressions that the second user has indicated as undesirable. Specifically, the media guidance application may compare, for each media asset within the plurality of media assets, each depiction of the plurality of depictions with each of the one or more depiction entries. For example, the media guidance application may iterate through the depictions of the second user in the media assets and compare the second user's facial expressions, actions, or objects held in those depictions with the facial expressions, actions, and objects held that the second user has indicated as undesirable.

The media guidance application may determine based on the comparison whether a match between the media assets depicting the second user and the entries that the second user has indicated as undesirable is found. Specifically, the media guidance application may determine, based on the comparing, whether any of the one or more depiction entries match any depiction of the plurality of depictions. For example, the media guidance application may detect, through image processing, that the user's facial expression in a photo of the user matches a facial expression that the user finds undesirable, as indicated by a retrieved depiction entry.

The media guidance application may keep track of the matches it finds. Specifically, in response to determining that any of the one or more depiction entries match any depiction of the plurality of depictions, the media guidance application may store an indication of each depiction of the plurality of depictions that matches any of the one or more depiction entries. For example, the media guidance application may store a unique identifier for each depiction into memory when the depiction matches a depiction entry indicating an undesirable expression.

The media guidance application may alert the user that media assets associated with another user depict the user in a state undesirable to the user. Specifically, the media guidance application may generate a notification to the second user indicating that one or more depictions of the second user in the plurality of media assets match the one or more depiction entries. For example, the media guidance application may display a notification on a user device of the second user with options to view the relevant depictions and take further actions.

In some embodiments, the media guidance application may transmit the request to the remote server by transmitting a query including a user identifier to the remote server. Specifically, the media guidance application may retrieve a user identifier associated with the second user. The media guidance application may generate a query for the one or more depiction entries, where the query includes the user identifier, and transmit this query to the server. For example, the media guidance application may retrieve the user identifier from a database storing user identifiers of users that are registered with the application. The media guidance application may generate an HTTP GET request including the user identifier and a request identifier indicating a request for depiction entries representing depictions of the second user that the second user has indicated are undesirable.

In some embodiments, the media guidance application may receive keywords associated with each depiction entry. Specifically, the media guidance application may receive, in response to the request for one or more depiction entries, one or more depiction entry keywords that are associated with each of the one or more depiction entries. For example, the data structure containing the depiction entries may map each depiction entry to one or more associated depiction entry keywords.

In some embodiments, the media guidance application may receive identifiers of undesirable depictions that have been pre-defined. Specifically, the media guidance application may receive, in response to the request for one or more depiction entries, one or more identifiers, where each of the one or more identifiers is associated with a pre-defined undesirable depiction. For example, the media guidance application may receive, in a data structure of depiction entries, identifiers of undesirable depictions that have been pre-defined by the user or the system.

In some embodiments, the media guidance application may generate keywords associated with each depiction of the second user in the plurality of media assets. Specifically, the media guidance application may extract, using an image analysis algorithm, one or more media asset depiction keywords from each depiction of the plurality of depictions. For example, the media guidance application may use a machine learning algorithm to process a depiction and generate keywords associated with the depiction.

In some embodiments, the media guidance application may compare the keywords associated with the depiction entries (e.g., indicating the facial expressions the user has deemed undesirable) and the keywords associated with the depictions of the user in the media assets. Specifically, the media guidance application may compare each keyword of the one or more media asset depiction keywords with each keyword of the one or more depiction entry keywords. For example, the media guidance application may execute a routine to iterate through the keywords and compare each media asset keyword with each depiction entry keyword to detect a match.

In some embodiments, the media guidance application may determine whether there is a match between any of the keywords associated with the depiction entries (e.g., indicating the facial expressions the user has deemed undesirable) and any of the keywords associated with the depictions of the user in the media assets. Specifically, the media guidance application may determine, based on comparing each keyword of the one or more media asset depiction keywords with each keyword of the one or more depiction entry keywords, whether one or more entry depiction keywords match one or more media asset depiction keywords. For example, after executing a routing that iterates through the keywords, the media guidance application may identify a number of matching keyword pairs, where each pair includes a media asset depiction keyword and a depiction entry keyword.

In some embodiments, the media guidance application may determine whether the second user has indicated an action that should be taken if there is a match (i.e., if an undesired expression in a depiction has been detected). Specifically, the media guidance application may determine whether the second user indicated one or more pre-determined actions to be performed based on determining that a depiction of the plurality of depictions matches any of the one or more depiction entries. For example, the media guidance application may check a user profile of the second user to determine whether the second user has indicated, manually or through previous behavior, an action to be performed in response to determining any matches between the depictions of the second user in the media assets and the one or more depiction entries indicating expressions the second user has indicated are undesirable.

In some embodiments, if the second user has not already specified a particular action to be performed, the media guidance application may show the second user options that represent actions that may be taken. Specifically, the media guidance application may, in response to determining that the second user did not indicate the one or more pre-determined actions to be performed, generate for display one or more actions that the second user may select to be performed. For example, the media guidance application may display, on a screen of a user device of the second user, a list of possible actions, such as "Delete All", "Select Items to Delete", "Blur All", "Select Items to Blur", etc.

In some embodiments, the media guidance application may retrieve an action that the second user has indicated should be taken if there is a match. Specifically, the media guidance application may retrieve a pre-determined action that the second user indicated to be performed in response to determining that one or more depictions of the second user in the plurality of media assets match the one or more depiction entries. For example, the media guidance application may retrieve a user profile of the second user and identify the pre-determined action to take from the user profile.

In some embodiments, the media guidance application may execute the action that the second user has indicated should be taken if there is a match. Specifically, the media guidance application may perform the pre-determined action on each depiction of the plurality of depictions that matches any of the one or more depiction entries. For example, the media guidance application may determine, from the user profile of the second user, that the second user has indicated that undesirable depictions of them should be blurred. The media guidance application may accordingly blur each depiction of the plurality of depictions that matches any of the one or more depiction entries indicating an undesirable expression.

In some embodiments, the media guidance application may determine whether the depictions that have been found to be undesirable are associated with a video. Specifically, the media guidance application may determine whether a first depiction of the plurality of depictions that matches a first entry of the one or more depiction entries is associated with a media asset comprising video. For example, the media guidance application may look up, in a table mapping depiction identifiers to media asset identifiers and corresponding media asset types, a depiction identifier in order to determine whether the media asset the depiction is associated with comprises video.

The media guidance application may, upon identifying a video associated with an undesirable depiction, compile a set of undesirable depictions from the video. Specifically, the media guidance application may, in response to determining that a first depiction of the plurality of depictions that matches a first depiction entry of the one or more depiction entries is associated with a media asset comprising video, identify a set of depictions in the media asset comprising video, where each depiction in the set matches the one or more depiction entries. For example, the media guidance application may, upon determining that an undesirable depiction is associated with a video, scan the video for other depictions of the second user, determine whether the other depictions are undesirable, and add the depictions that have been determined to be undesirable to a set of undesirable depictions.

The media guidance application may store the start and end times of each depiction in the set of undesirable depictions. Specifically, the media guidance application may store, in a data structure for each depiction in the set of depictions, a start time of the depiction within the video, an end time of the depiction within the video, and an identifier of a matching depiction entry of the one or more depiction entries. For example, the media guidance application may, for each depiction in the set of undesirable depictions, generate a data structure that maps the depiction to the start and end times within the video that the depiction is included in, as well as a depiction entry identifier that indicates which depiction entry the depiction matched with.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 is an illustrative example of data structures for storing data on media asset depictions and depictions indicated as undesirable by a user, in accordance with some embodiments of the disclosure;

DETAILED DESCRIPTION

Figure 2:
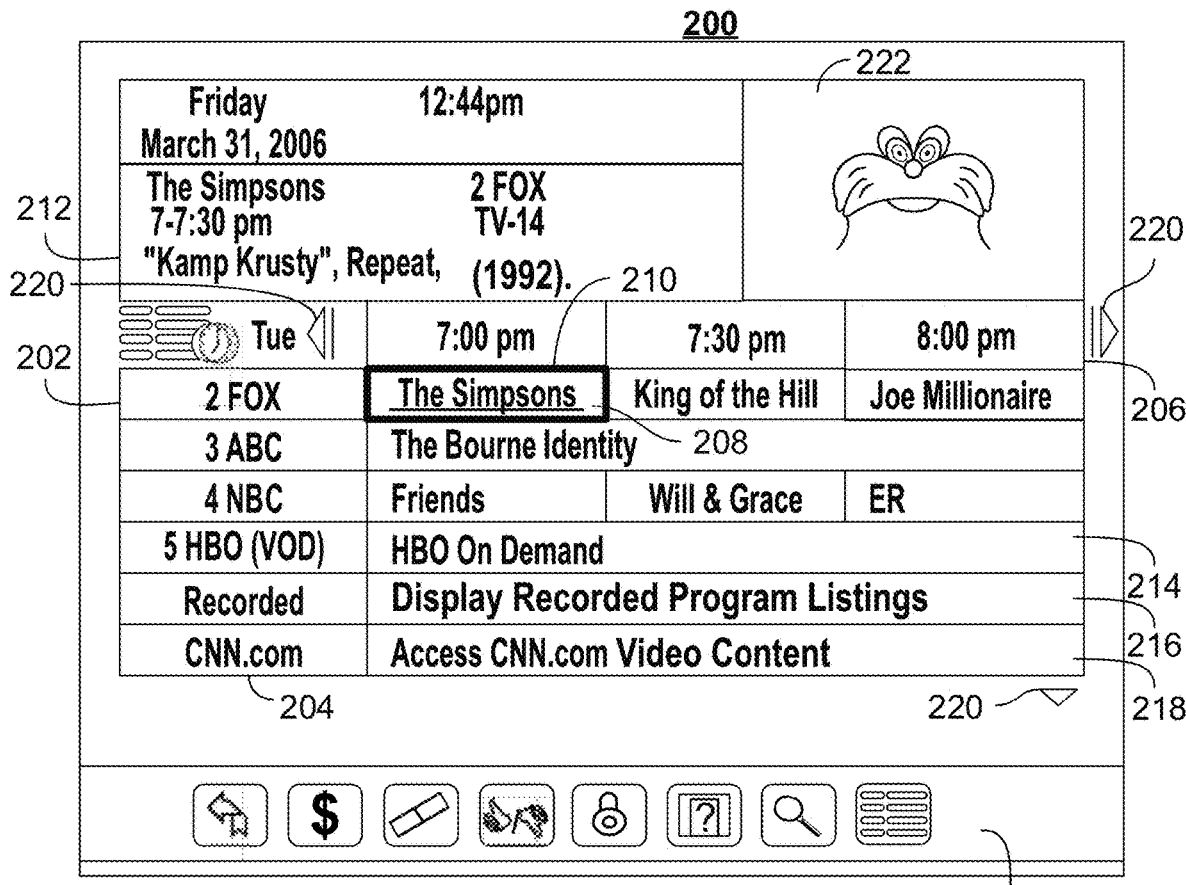
FIG. 2 shows an illustrative example of a display screen for use in accessing media content in accordance with some embodiments of the disclosure.

Systems and methods are disclosed herein for warning a user that media assets associated with another user depict the user in an undesired state. Specifically, a plurality of media assets associated with a first user may be identified, where each media asset within the plurality of media assets includes a depiction of a second user. A set of states of the second user that the second user has indicated as undesirable may be retrieved. It may be determined whether the one or more media assets associated with the first user depict the second user in a state in the set of states that the second user has indicated are undesirable. In response to determining that one or more of the media assets depicts the second user in an undesirable state, a notification indicating the determination may be generated for the second user.

A media guidance application in accordance with the present disclosure may determine that some of a user's media assets depict another user. Specifically, the media guidance application may determine that each of a plurality of media assets associated with a first user includes a depiction of a second user. For example, the media guidance application may traverse through a media library of the first user (e.g., photos and videos that the first user has uploaded to the Internet or has stored on a user equipment device) and generate data structure 100 of FIG. 1 to store data on depictions of the second user. The data may include media asset identifier fields 102 and media asset type fields 104. The data may include depiction identifier fields 106 and depiction data fields 108, where each depiction identifier may be a unique identifier (e.g., a hexadecimal number) for the corresponding depiction, and depiction data may include, for example, a bitmap or compressed image associated with each depiction. In some embodiments, the data may also include keyword data fields as well as other appropriate data fields. The media guidance application may use facial recognition algorithms to detect depictions of the second user. For example, the media guidance application may store image signatures of a plurality of users and detect that a user is depicted in a media asset by calculating a similarity between the media asset depiction and the user's image signature. The media guidance application may also use user-created "tags" to detect depictions of the second user.

The media guidance application may generate and transmit a request for a list of depictions (e.g., facial expressions, depictions with the user holding a specific object, or taking a specific action) of the second user that the second user finds undesirable (e.g., angry facial expression, user holding a gun, or punching another person). Specifically, the media guidance application may transmit a request, to a remote server, for one or more depiction entries, where each depiction entry represents one or more depictions of the second user that the second user has indicated as undesirable. For example, the media guidance application may transmit, to a remote server that has access to data associated with a group of users, an HTTP GET request or a request using another communications protocol containing an identifier of the second user. The one or more depiction entries may have been indicated as undesirable by the second user, and in some embodiments, may be stored in a user profile of the second user. In another example, the one or more depiction entries may have been indicated as undesirable by the second user through past actions of the second user, such as "untagging" themselves in corresponding depictions.

The media guidance application may receive a response that includes data on facial expressions of the second user that the second user has indicated are undesirable. Specifically, the media guidance application may receive, in response to the request, a data structure including the one or more depiction entries. Depiction entries may include facial expressions, depictions with the user holding a specific object, or taking a specific action. For example, the media guidance application may receive data structure 120 of FIG. 1 including depiction entries that have been retrieved from a database that resides on the remote server. Each entry may include, for example, a unique identifier 122 and depiction data 124 associated with the undesired depiction. In some embodiments, keyword data (not shown) may be included in the depiction data or may be included as a separate field. The depiction data may include, for example, a bitmap or compressed image associated with each depiction, keyword data, or other data identifying a type of a depiction (a specific facial expression, an action the user is taking, or an object the user is holding or wearing).

The media guidance application may attempt to find a match between the media assets depicting the second user and the expressions that the second user has indicated as undesirable. Specifically, the media guidance application may compare, for each media asset within the plurality of media assets, each depiction of the plurality of depictions with each of the one or more depiction entries. For example, the media guidance application may iterate through the depictions of the second user in the media assets and compare the second user's facial expressions, actions, or objects held in those depictions with the facial expressions, actions, and objects held that the second user has indicated as undesirable. The media guidance application may use image processing and machine learning algorithms to identify facial expressions, actions, and/or objects held by the second user in the depictions. For example, the media guidance application may use a K-nearest neighbor classifier algorithm to compare facial expressions in the media assets with facial expressions indicated as undesirable by the depiction entries.

The media guidance application may determine, based on the comparison, whether a match between the media assets depicting the second user and the entries that the second user has indicated as undesirable is found. Specifically, the media guidance application may determine, based on the comparing, whether any of the one or more depiction entries match any depiction of the plurality of depictions. For example, the media guidance application may detect, through an image processing algorithm, that the second user's facial expression in a photo depicting the second user matches a facial expression that the second user finds undesirable, as indicated by a retrieved depiction entry. In another example, the media guidance application may use a computer vision algorithm to detect the presence of an undesirable object in a video of the second user and determine a match between the video and a depiction entry corresponding to the undesirable object. The computer vision algorithm may, for example, analyze each frame of the video to determine whether a match has been found.

The media guidance application may keep track of the matches it finds. Specifically, in response to determining that any of the one or more depiction entries match any depiction of the plurality of depictions, the media guidance application may store an indication of each depiction of the plurality of depictions that matches any of the one or more depiction entries. For example, the media guidance application may store a unique identifier for each depiction in memory when the depiction matches a depiction entry indicating an undesirable expression. The stored indications may be retrieved to, for example, alert the user of the depictions. The unique identifier for each depiction may be, for example, a unique string of characters, a hash of the depiction data, etc.

The media guidance application may alert the user that media assets associated with another user depict the user in a state undesirable to the user. Specifically, the media guidance application may generate a notification to the second user indicating that one or more depictions of the second user in the plurality of media assets match the one or more depiction entries. For example, the media guidance application may display a notification on the screen of a user device of the second user with options to view the relevant depictions and take further actions. The media guidance application may retrieve the stored indications of the undesirable depictions and display thumbnails of the depictions to the user. The options for further actions displayed in the notification to the user may be determined automatically by the system or configured manually by the user.

In some embodiments, the media guidance application may transmit the request to the remote server by transmitting a query including a user identifier to the remote server. Specifically, the media guidance application may retrieve a user identifier associated with the second user. The media guidance application may generate a query for the one or more depiction entries, where the query includes the user identifier, and transmit the query to the server. For example, the media guidance application may retrieve the user identifier from a database storing user identifiers of users that are registered with the application. The media guidance application may generate an HTTP GET request including the user identifier and a request identifier indicating a request for depiction entries representing depictions of the second user that the second user has indicated are undesirable. The media guidance application may transmit the generated HTTP GET request to the remote server.

In some embodiments, the media guidance application may receive keywords associated with each depiction entry. Specifically, the media guidance application may receive, in response to the request for one or more depiction entries, one or more depiction entry keywords that are associated with each of the one or more depiction entries. For example, data structure 120 of FIG. 1, containing the depiction entries and received by the media guidance application, may map each depiction entry to one or more associated depiction entry keywords. The keywords may be stored in the depiction data fields or in a separate field (not shown). For example, the keywords for each depiction entry may be generated by the media guidance application through an image or video processing algorithm used on each depiction. In another example, the user may provide keywords for each depiction entry when indicating that the depiction corresponding to the depiction entry is undesirable.

In some embodiments, the media guidance application may receive identifiers of undesirable depictions that have been pre-defined. Specifically, the media guidance application may receive, in response to the request for one or more depiction entries, one or more identifiers, where each of the one or more identifiers is associated with a pre-defined undesirable depiction. For example, the media guidance application may receive, in a data structure of depiction entries, identifiers of undesirable depictions that have been pre-defined by the user or the system. For example, each undesirable depiction may be associated with an alphanumeric code. Specifically, an angry facial expression may be associated with a code F1 (facial expression 1). A user action where a user is punching someone may be associated with a code A1 (action 1). A depiction depicting a user with an undesired object (e.g., a gun) may be associated with a code O1 (object 1). These codes may be pre-defined and changed (e.g., codes added or removed) as needed.

In some embodiments, the media guidance application may generate keywords associated with each depiction of the second user in the plurality of media assets. Specifically, the media guidance application may extract, using an image analysis algorithm, one or more media asset depiction keywords from each depiction of the plurality of depictions. For example, the media guidance application may use a machine learning algorithm to process a depiction and generate keywords associated with the depiction. The media guidance application may store these keywords in keyword data fields 110 of data structure 100 of FIG. 1. The keywords may be associated with, for example, a facial expression, a physical attribute, an object, an action, a location, an identifier or another user, etc. The keywords may be stored in the form of, for example, a lexicographic binary search tree.

In some embodiments, the media guidance application may compare the keywords associated with the depiction entries (e.g., indicating the facial expressions the user has deemed undesirable) and the keywords associated with the depictions of the user in the media assets. Specifically, the media guidance application may compare each keyword of the one or more media asset depiction keywords with each keyword of the one or more depiction entry keywords. For example, the media guidance application may execute a routine to iterate through the keywords and compare each media asset keyword with each depiction entry keyword to detect a match.

In some embodiments, the media guidance application may determine whether there is a match between any of the keywords associated with the depiction entries (e.g., indicating the facial expressions the user has deemed undesirable) and any of the keywords associated with the depictions of the user in the media assets. Specifically, the media guidance application may determine, based on comparing each keyword of the one or more media asset depiction keywords with each keyword of the one or more depiction entry keywords, whether one or more entry depiction keywords match one or more media asset depiction keywords. For example, after executing a routing that iterates through the keywords, the media guidance application may identify a number of matching keyword pairs, where each pair includes a media asset depiction keyword and a depiction entry keyword. The media guidance application may use natural language processing to detect matches between similar keywords in addition to identical keywords. For example, the media guidance application may detect a match between keywords "fight" and "fighting," "beer" and "alcohol," "anger" and "unhappy," etc.

In some embodiments, the media guidance application may determine whether the second user has indicated an action that should be taken if there is a match (i.e., if an undesired expression in a depiction has been detected). Specifically, the media guidance application may determine whether the second user indicated one or more pre-determined actions to be performed based on determining that a depiction of the plurality of depictions matches any of the one or more depiction entries. For example, the media guidance application may check a user profile of the second user to determine whether the second user has indicated, manually or through previous behavior, an action to be performed in response to determining any matches between the depictions of the second user in the media assets and the one or more depiction entries indicating expressions the second user has indicated are undesirable. In one example, the pre-determined actions may have been selected by the second user through a user interface presented to the second user by the media guidance application with options for pre-determined actions. In another example, the media guidance application may determine a pre-determined action based on the second user's past behavior and actions.

In some embodiments, if the second user has not already specified a particular action to be performed, the media guidance application may show the second user options that represent actions that may be taken. Specifically, the media guidance application may, in response to determining that the second user did not indicate the one or more pre-determined actions to be performed, generate for display one or more actions that the second user may select to be performed. For example, the media guidance application may display, on a screen of a user device of the second user, a list of possible actions, such as "Delete All", "Select Items to Delete", "Blur All", "Select Items to Blur", etc. The media guidance application may retrieve these actions from, for example, a database storing potential actions, the user profile of another user, etc.

In some embodiments, the media guidance application may retrieve an action that the second user has indicated should be taken if there is a match. Specifically, the media guidance application may retrieve a pre-determined action that the second user indicated to be performed in response to determining that one or more depictions of the second user in the plurality of media assets match the one or more depiction entries. For example, the media guidance application may retrieve a user profile of the second user and identify the pre-determined action to take from the user profile. In some cases, the second user may have indicated different pre-determined actions to be taken for different types of depictions. For example, the second user may have indicated that they would like depictions including a particular facial expression to be blurred and depictions including a particular object to be deleted.

In some embodiments, the media guidance application may execute the action that the second user has indicated should be taken if there is a match. Specifically, the media guidance application may perform the pre-determined action on each depiction of the plurality of depictions that matches any of the one or more depiction entries. For example, the media guidance application may determine, from the user profile of the second user, that the second user has indicated that undesirable depictions of them should be blurred. The media guidance application may accordingly blur each depiction of the plurality of depictions that matches any of the one or more depiction entries indicating an undesirable expression. In another example, where the second user has indicated different pre-determined actions to be taken for different types of depictions, the media guidance application may execute the appropriate action corresponding to each match on a case-by-case basis.

In some embodiments, the media guidance application may determine whether the depictions that have been found to be undesirable are associated with a video. Specifically, the media guidance application may determine whether a first depiction of the plurality of depictions that matches a first entry of the one or more depiction entries is associated with a media asset comprising video. For example, the media guidance application may iterate through data structure 100 of FIG. 1 and check media asset type fields 104 to determine, for each depiction, whether the media asset associated with the depiction has a type indicating video.

The media guidance application may, upon identifying a video associated with an undesirable depiction, compile a set of undesirable depictions from the video. Specifically, the media guidance application may, in response to determining that a first depiction of the plurality of depictions that matches a first depiction entry of the one or more depiction entries is associated with a media asset including video, identify a set of depictions in the media asset comprising video, where each depiction in the set matches the one or more depiction entries. For example, the media guidance application may, upon determining that an undesirable depiction is associated with a video, scan the video for other depictions of the second user, determine whether the other depictions are undesirable, and add the depictions that have been determined to be undesirable to a set of undesirable depictions. The media guidance application may scan the video frame by frame to detect depictions of the user. In some cases, the media guidance application may group multiple consecutive frames of the video into one corresponding depiction. For example, the media guidance application may analyze a video with media asset identifier "MA ID #2," as shown in fields 112 and 114 in FIG. 1, and detect two depictions with unique identifiers "Depiction ID #2" and "Depiction ID #3." The two depictions may correspond to respective segments of the media asset.

The media guidance application may store the start and end times of each depiction in the set of undesirable depictions. Specifically, the media guidance application may store, in a data structure for each depiction in the set of depictions, a start time of the depiction within the video, an end time of the depiction within the video, and an identifier of a matching depiction entry of the one or more depiction entries. For example, the media guidance application may, for each depiction in the set of undesirable depictions, generate a data structure that maps the depiction to the start and end times within the video that the depiction is included in, as well as a depiction entry identifier that indicates which depiction entry the depiction matched with. In some cases, the ranges between start time and end time of the depictions may be distinct and non-overlapping. In other cases, the time ranges may overlap. For example, a media asset may depict a user with an angry facial expression from a first start time 00:23:09 to a first end time 00:26:30. The media asset may also depict the user engaging in a fight from a second start time 00:25:00 to a second end time 00:27:00, where the second start time comes before the first end time and results in overlapping ranges between the start and end times of the depictions.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
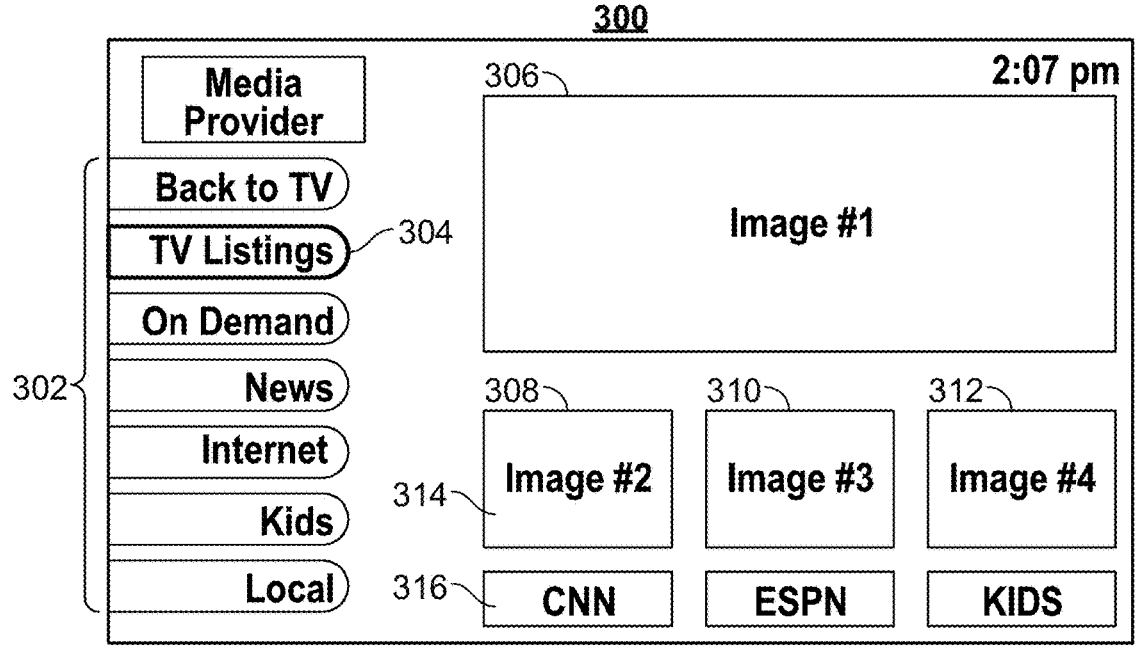
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 224. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 224 may allow the user to access different types of content, media guidance application displays, and/or media guidance application features. Options region 224 may be part of display 200 (and other display screens described herein), or may be invoked by a user by selecting an on-screen option or pressing a dedicated or assignable button on a user input device. The selectable options within options region 224 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
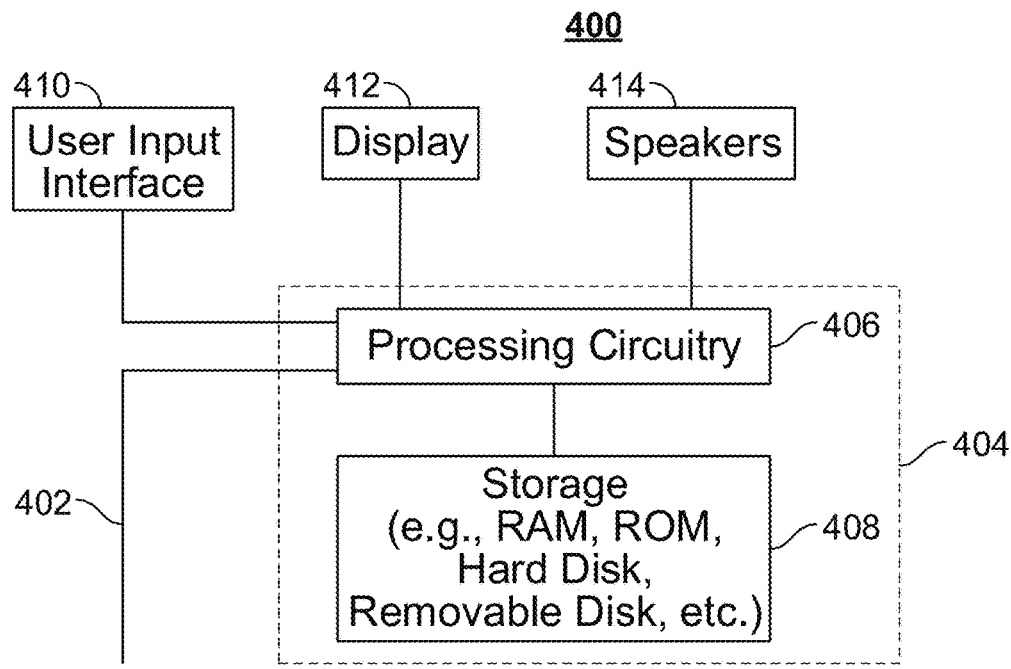
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays.

For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
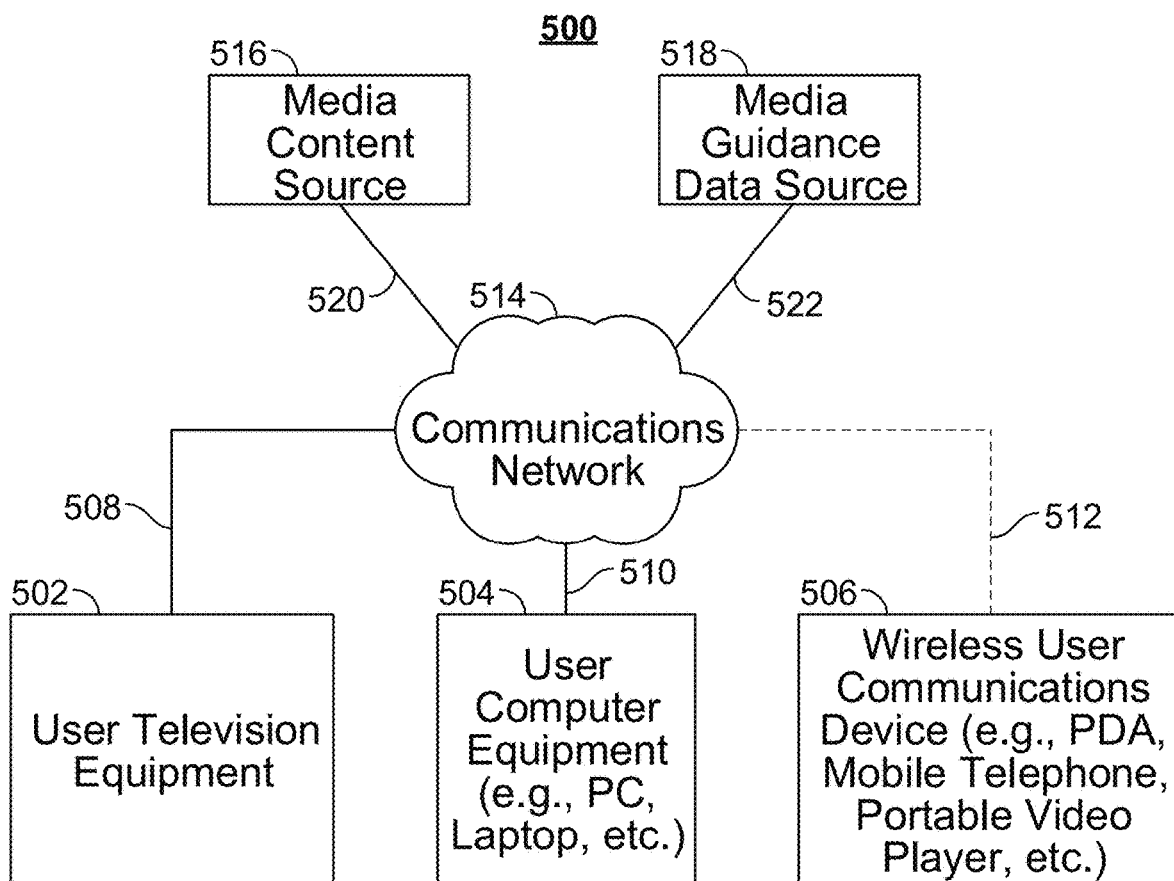
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
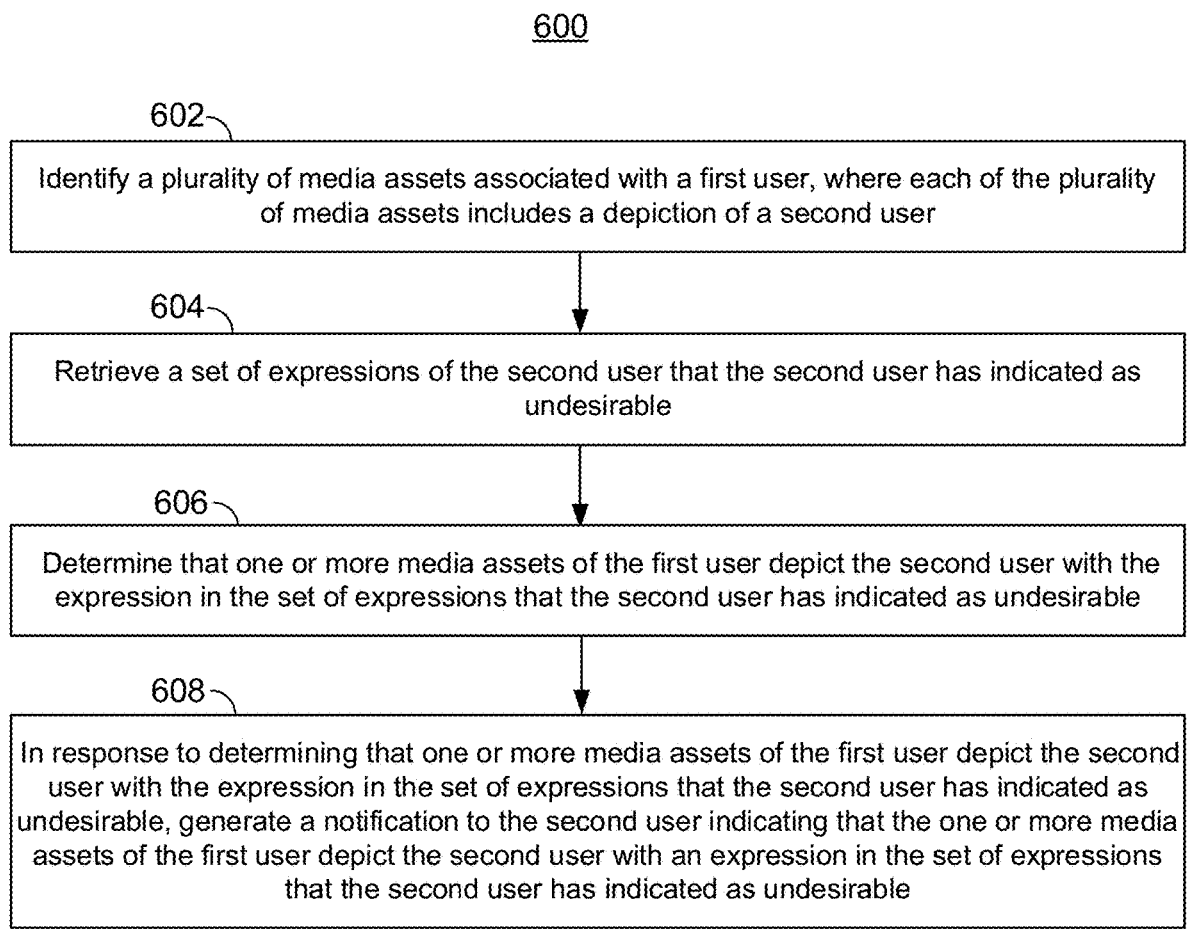
FIG. 6 is a flowchart of illustrative actions for warning a user that media assets associated with another user depict the user with an undesired expression, in accordance with some embodiments of the disclosure.

FIG. 6 is a flowchart of illustrative actions for warning a user that media assets associated with another user depict the user with an undesired expression, in accordance with some embodiments of the disclosure. At 602, control circuitry 404 identifies a plurality of media assets associated with a first user, where each of the plurality of media assets includes a depiction of a second user. For example, control circuitry 404 may access media assets associated with the first user in storage 408 and execute an algorithm to identify depictions of the second user in the media assets. In some embodiments, control circuitry 404 may access the media content at a remote server (e.g., a server associated with media content source 516 or media guidance data source 518).

At 604, control circuitry 404 retrieves a set of expressions of the second user that the second user has indicated as undesirable. The control circuitry may, for example, access a profile associated with the second user that includes the set of undesirable expressions in storage 408. In some embodiments, control circuitry 404 may access a profile of the second user that includes the set of undesirable expressions at a remote server (e.g., a server associated with media content source 516 or media guidance data source 518).

At 606, control circuitry 404 determines that one or more media assets of the first user depict the second user with an expression in the set of expressions that the second user has indicated as undesirable. At 608, in response to determining that one or more media assets of the first user depict the second user with the expression in the set of expressions that the second user has indicated as undesirable, control circuitry 404 generates a notification to the second user indicating that the one or more media assets of the first user depict the second user with an expression in the set of expressions that the second user has indicated as undesirable. For example, control circuitry 404 may display the notification on display 412. Alternatively or additionally, control circuitry 404 may output a sound notification through speakers 414.

Figure 7:
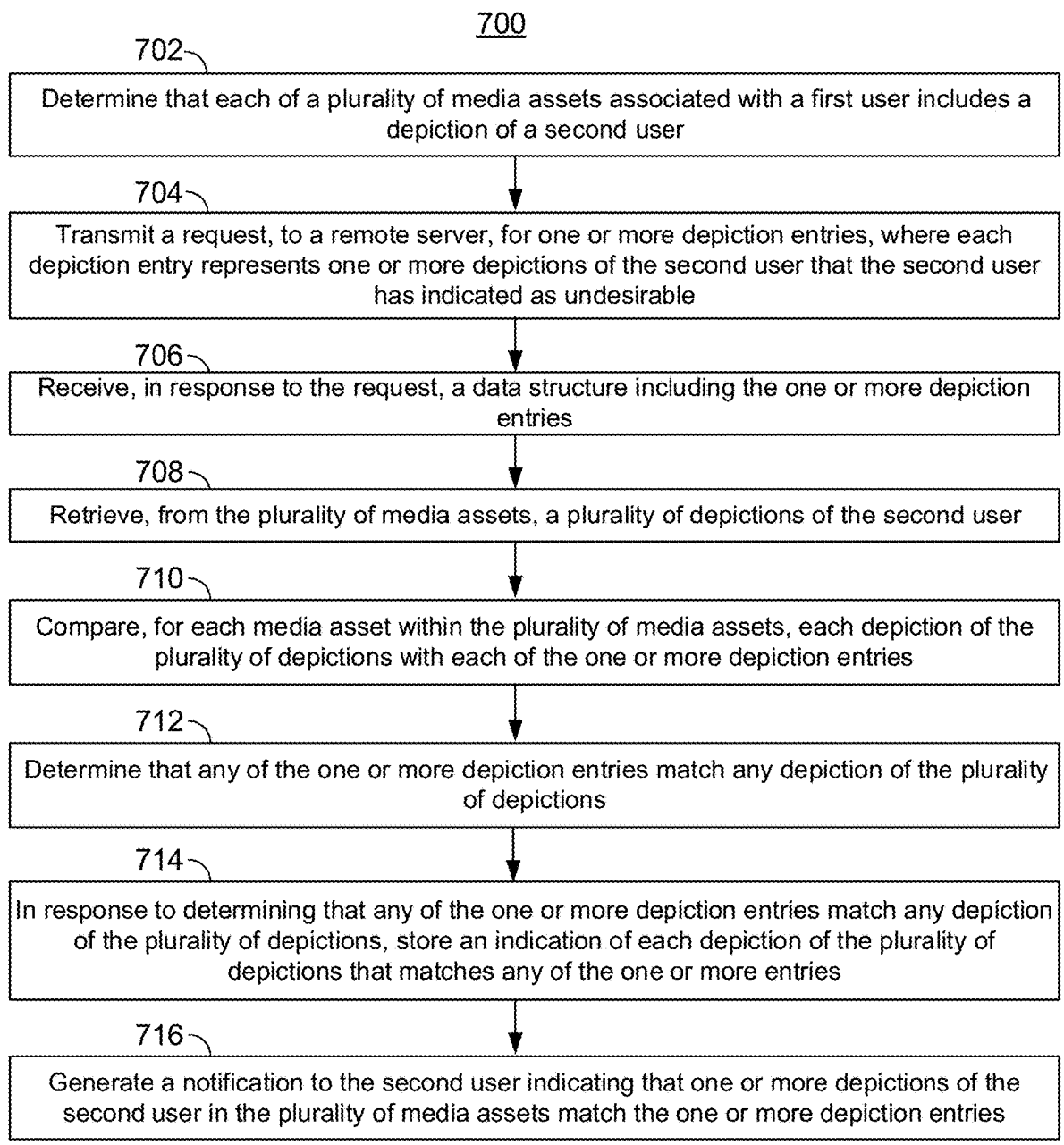
FIG. 7 is a flowchart of illustrative actions for warning a user that media assets associated with another user depict the user in an undesired state, in accordance with some embodiments of the disclosure.

FIG. 7 is a flowchart of illustrative actions for warning a user that media assets associated with another user depict the user in an undesired state, in accordance with some embodiments of the disclosure. At 702, control circuitry 404 determines that each of a plurality of media assets associated with a first user includes a depiction of a second user. For example, control circuitry 404 may access media assets associated with the first user in storage 408 and execute an algorithm to determine that the media assets include depictions of the second user. In some embodiments, control circuitry 404 may access the media content at a remote server (e.g., a server associated with media content source 516 or media guidance data source 518).

At 704, control circuitry 404 transmits a request, to a remote server, for one or more depiction entries, where each depiction entry represents one or more depictions of the second user that the second user has indicated as undesirable. The remote server may be associated with media content source 516 or media guidance data source 518. At 706, control circuitry 404 receives, in response to the request, a data structure including the one or more depiction entries. The control circuitry may, for example, store the data structure in storage 408.

At 708, control circuitry 404 retrieves, from the plurality of media assets, a plurality of depictions of the second user. For example, control circuitry 404 may access the media assets in storage 408 and execute a routine to extract the depictions of the second user. In some embodiments, control circuitry 404 may access the media content at a remote server (e.g., a server associated with media content source 516 or media guidance data source 518). Alternatively or additionally, the control circuitry may retrieve the depictions of the second user from storage 408.

At 710, control circuitry 404 compares, for each media asset within the plurality of media assets, each depiction of the plurality of depictions with each of the one or more depiction entries. The control circuitry may retrieve the plurality of depictions from storage 408 (e.g., in a user profile in storage 408) or a remote server (e.g., a server associated with media content source 516 or media guidance data source 518). The control circuitry may also retrieve the one or more depiction entries from storage 408 (e.g., in a user profile in storage 408) or a remote server (e.g., a server associated with media content source 516 or media guidance data source 518).

At 712, control circuitry 404 determines, based on the comparing, that any of the one or more entries match any depiction of the plurality of depictions. At 714, in response to determining that any of the one or more depiction entries match any depiction of the plurality of depictions, control circuitry 404 stores an indication of each depiction of the plurality of depictions that matches any of the one or more entries. The control circuitry may, for example, store each indication in storage 408.

At 716, control circuitry 404 generates a notification to the second user indicating that one or more depictions of the second user in the plurality of media assets match the one or more depiction entries. For example, control circuitry 404 may display the notification to the second user on display 412. Alternatively or additionally, control circuitry 404 may output a sound notification through speakers 414.

Figure 8:
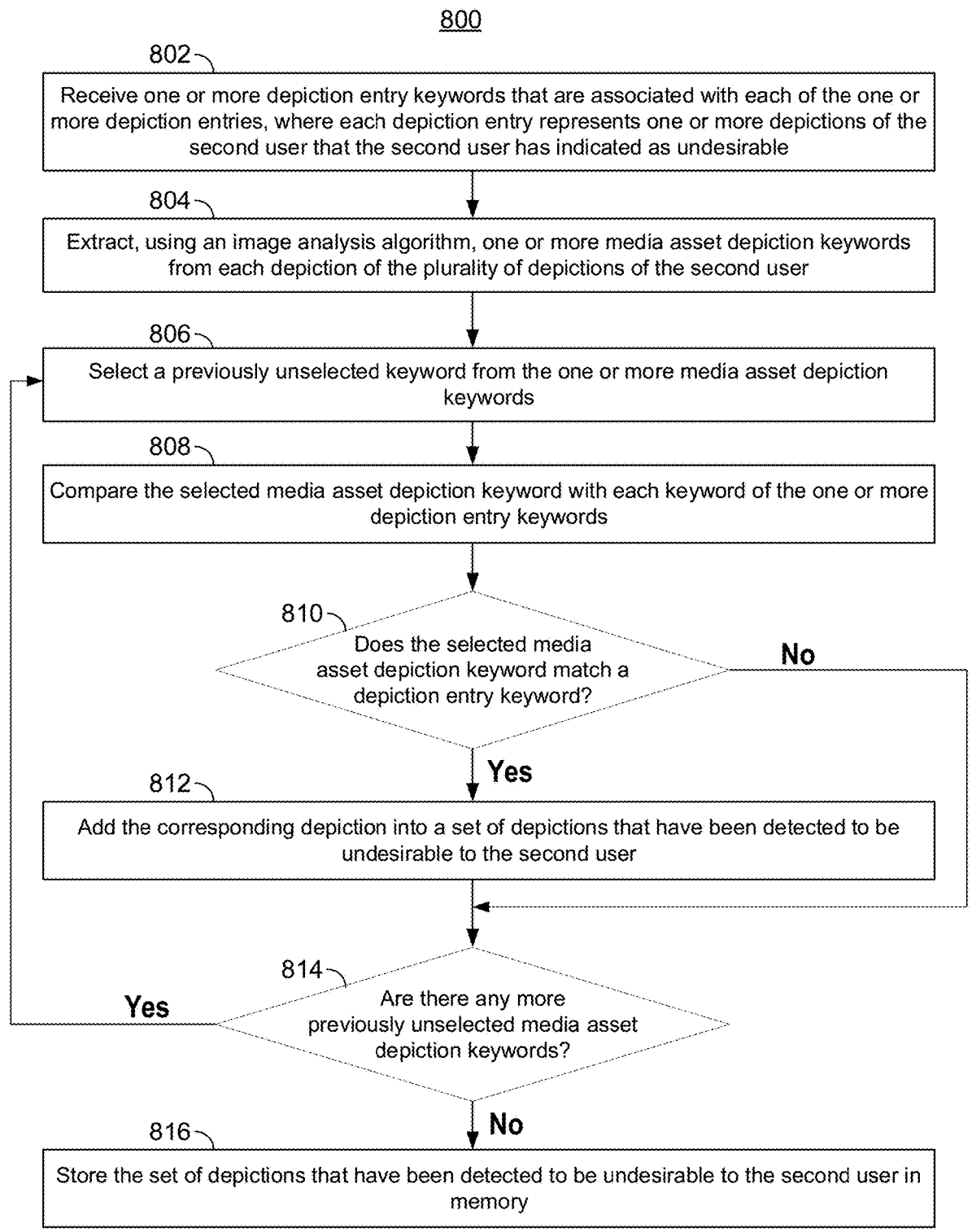
FIG. 8 is a flowchart of illustrative actions for determining whether there is a match between a media asset depicting a user and a depiction entry indicating an undesirable expression, in accordance with some embodiments of the disclosure.

FIG. 8 is a flowchart of illustrative actions for determining whether there is a match between a media asset depicting a user and a depiction entry indicating an undesirable expression, in accordance with some embodiments of the disclosure. At 802, control circuitry 404 receives one or more depiction entry keywords that are associated with each of the one or more depiction entries, where each depiction entry represents one or more depictions of the second user that the second user has indicated as undesirable. Control circuitry 404 may store the received depiction entry keywords in a data structure in, for example, random access memory.

At 804, control circuitry 404 extracts, using an image analysis algorithm, one or more media asset depiction keywords from each depiction of the plurality of depictions of the second user. For example, control circuitry 404 may access the depictions of the second user in storage 408 and execute an algorithm to extract the one or more media asset depiction keywords. In some embodiments, control circuitry 404 may access the media content at a remote server (e.g., a server associated with media content source 516 or media guidance data source 518). Control circuitry 404 may store the one or more media asset depiction keywords in a data structure in, for example, random access memory.

At 806, control circuitry 404 selects a previously unselected keyword from the one or more media asset depiction keywords. The control circuitry may, for example, use an iterator to iterate through the keywords to select each keyword once. At 808, control circuitry 404 compares the selected media asset depiction keyword with each keyword of the one or more depiction entry keywords. Control circuitry 404 may retrieve the keywords from storage 408, from, for example, random access memory.

At 810, control circuitry 404 determines, based on comparing the selected media asset depiction keyword with each keyword of the one or more depiction entry keywords, whether the selected media asset depiction keyword matches one or more depiction entry keywords. If the selected media asset depiction keyword matches any of the depiction entry keywords, process 800 proceeds to action 812. Otherwise, process 800 proceeds to action 814.

At 812, control circuitry 404 adds the depiction corresponding to the selected media asset depiction keyword into a set of depictions that have been detected to be undesirable to the second user. The set may be stored in, for example, a data structure in random access memory in storage 408. At 814, control circuitry 404 determines whether there are any more previously unselected media asset depiction keywords. If there are any more previously unselected media asset depiction keywords, process 800 proceeds to action 806, where control circuitry 404 selects a new previously unselected keyword from the one or more media asset depiction keywords. If there are no more previously unselected media asset depiction keywords, process 800 proceeds to action 816, where control circuitry 404 stores the set of depictions that have been detected to be undesirable to the second user in memory. The set of depictions may be stored, for example, in random access memory in storage 408.

Figure 9:
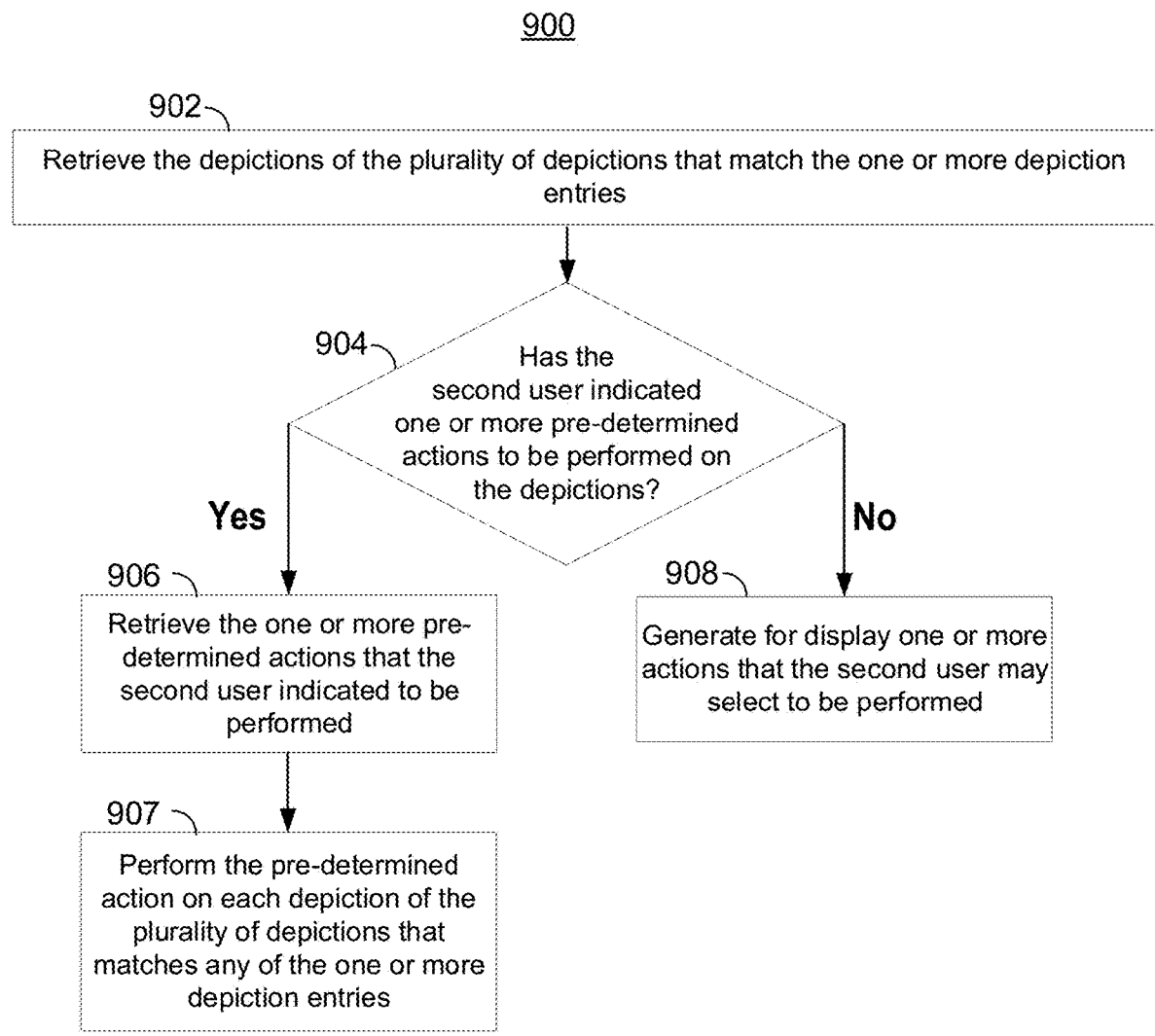
FIG. 9 is a flowchart of illustrative actions for selecting actions to take on the undesirable depictions, in accordance with some embodiments of the disclosure.

FIG. 9 is a flowchart of illustrative actions for selecting actions to take on the undesirable depictions, in accordance with some embodiments of the disclosure. At 902, control circuitry 404 retrieves the depictions of the plurality of depictions that match the one or more depiction entries. The depictions may be retrieved from, for example, storage 408 or a remote server (e.g., a server associated with media content source 516 or media guidance data source 518).

At 904, control circuitry 404 determines whether the second user has indicated one or more pre-determined actions to be performed on the depictions that match one or more depiction entries. If the second user has not indicated one or more pre-determined actions to be performed on the depictions that match one or more depiction entries, process 900 proceeds to action 908, where control circuitry 404 generates for display one or more actions that the second user may select to be performed. The one or more actions may be displayed to the second user on display 412. In some cases, sound may accompany the display and be output through speakers 414. Control circuitry 404 may receive user input in response to the display through, for example, user input interface 410.

If the second user has indicated one or more pre-determined actions to be performed on the depictions that match one or more depiction entries, process 900 proceeds to action 906, where control circuitry retrieves the one or more pre-determined actions that the second user indicated to be performed. The actions may be retrieved from storage 408 (e.g., in a user profile in storage 408) and/or a remote server (e.g., the server associated with media content source 516 and/or media guidance data source 518). At 907, control circuitry 404 performs the pre-determined action on each depiction that matches any of the one or more depiction entries.

Figure 10:
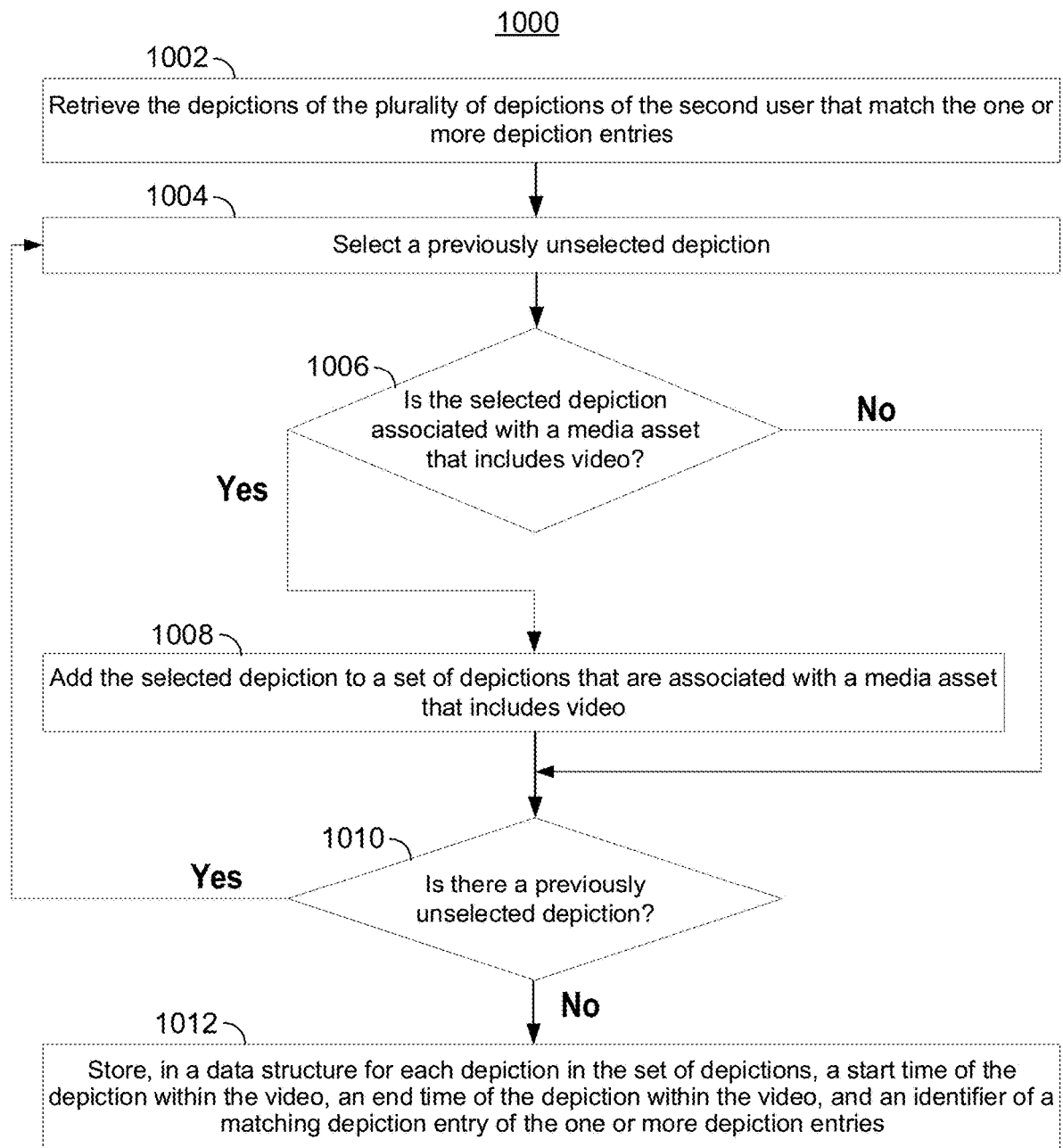
FIG. 10 is a flowchart of illustrative actions for storing depiction time ranges for media assets that include video, in accordance with some embodiments of the disclosure.

FIG. 10 is a flowchart of illustrative actions for storing depiction time ranges for media assets that include video, in accordance with some embodiments of the disclosure. At 1002, control circuitry 404 retrieves the depictions of the plurality of depictions of the second user that match the one or more depiction entries. The depictions may be retrieved from, for example, storage 408 or a remote server (e.g., a server associated with media content source 516 or media guidance data source 518).

At 1004, control circuitry 404 selects a previously unselected depiction from the depictions that match the one or more depiction entries. The control circuitry may, for example, use an iterator to iterate through the depictions to select each depiction once.

At 1006, control circuitry 404 determines whether the selected depiction is associated with a media asset that includes video. For example, the control circuitry may retrieve, for the selected media asset, a media asset identifier and media asset type, from which the control circuitry may determine whether the media asset associated with the depiction includes video. The media asset identifier and media asset type may be retrieved from, for example, a data structure in storage 408 or at a remote server. If the selected depiction is not associated with a media asset that includes video, process 1000 proceeds to action 1010. If the selected depiction is associated with a media asset that includes video, process 1000 proceeds to action 1008, where control circuitry 404 adds the selected depiction to a set of depictions that are associated with a media asset that includes video. The control circuitry may store the set of depictions in, for example, a data structure in random access memory of storage 408.

At 1010, control circuitry 404 determines whether there is a previous unselected depiction. If there is a previously unselected depiction, process 1000 proceeds to action 1004, where a new previously unselected depiction is selected. If there is not a previously unselected depiction, process 1000 proceeds to action 1012, where control circuitry 404 stores, in a data structure for each depiction in the set of depictions, a start time of the depiction within the video, an end time of the depiction within the video, and an identifier of a matching depiction entry of the one or more depiction entries. The data structure may be stored in, for example, random access memory in storage 408.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for warning a user that media assets associated with another user depict the user in a state undesirable to the user, the method comprising:
   determining that each of a plurality of media assets associated with a first user includes a depiction of a second user;
   transmitting a request, to a remote server, for one or more undesirable depiction entries, wherein each depiction entry is associated with an undesirable keyword indicating one or more undesirable visual expressions of the second user;
   receiving, in response to the request, the one or more undesirable depiction entries;
   retrieving, from the plurality of media assets, a plurality of depictions of the second user, wherein each of the plurality of depictions is associated with a depiction keyword;
   comparing, for each media asset within the plurality of media assets, each depiction keyword associated with each of the plurality of depictions with each undesirable keyword associated with each of the one or more undesirable depiction entries;
   determining, based on the comparing, whether any of the one or more undesirable depiction entries match any depiction of the plurality of depictions;
   in response to determining that any of the one or more undesirable depiction entries match any depiction of the plurality of depictions, storing an indication of each depiction of the plurality of depictions that matches any of the one or more undesirable depiction entries; and
   generating a notification to the second user indicating that one or more depictions of the second user in the plurality of media assets match the one or more undesirable depiction entries.

2. The method of claim 1, wherein transmitting the request, to the remote server, for the one or more undesirable depiction entries comprises:
   retrieving a user identifier associated with the second user;
   generating a query for the one or more undesirable depiction entries, wherein the query includes the user identifier; and
   transmitting the query to the remote server.

3. The method of claim 1, wherein receiving, in response to the request, the one or more undesirable depiction entries comprises receiving a data structure comprising the one or more undesirable depiction entries and each associated undesirable keyword.

4. The method of claim 3, wherein retrieving, from the plurality of media assets, the plurality of depictions of the second user comprises extracting, using an image analysis algorithm, one or more depiction keywords associated with each depiction of the plurality of depictions.

5. The method of claim 1, wherein determining, based on the comparing, whether any of the one or more undesirable depiction entries match any depiction of the plurality of depictions comprises determining, based on comparing each keyword of the one or more media asset depiction keywords with each keyword of the one or more depiction entry keywords, whether one or more entry depiction keywords match one or more media asset depiction keywords.

6. The method of claim 1, further comprising:
   retrieving a pre-determined action that the second user indicated to be performed in response to determining that one or more depictions of the second user in the plurality of media assets match the one or more undesirable depiction entries; and
   performing the pre-determined action on each depiction of the plurality of depictions that matches any of the one or more undesirable depiction entries.

7. The method of claim 1, further comprising:
   determining whether the second user indicated one or more pre-determined actions to be performed based on determining that a depiction of the plurality of depictions matches any of the one or more undesirable depiction entries; and
   in response to determining that the second user did not indicate the one or more pre-determined actions to be performed, generating for display one or more actions that the second user may select to be performed.

8. The method of claim 1, wherein storing an indication of each depiction of the plurality of depictions that matches any of the one or more entries comprises:
   determining whether a first depiction of the plurality of depictions that matches a first entry of the one or more undesirable depiction entries is associated with a media asset comprising video;
   in response to determining that the first depiction of the plurality of depictions that matches a first depiction entry of the one or more undesirable depiction entries is associated with a media asset comprising video, identifying a set of depictions in the media asset comprising video, wherein each depiction in the set matches the one or more undesirable depiction entries; and
   storing, in a data structure for each depiction in the set of depictions, a start time of the depiction within the video, an end time of the depiction within the video, and an identifier of a matching depiction entry of the one or more undesirable depiction entries.

9. The method of claim 1, wherein receiving, in response to the request, the one or more undesirable depiction entries comprises receiving one or more identifiers, wherein each of the one or more identifiers is associated with a pre-defined undesirable depiction.

10. A system for warning a user that media assets associated with another user depict the user in a state undesirable to the user, the system comprising:
    communications circuitry; and
    control circuitry configured to:

determine that each of a plurality of media assets associated with a first user includes a depiction of a second user;

transmit, using the communications circuitry, a request, to a remote server, for one or more undesirable depiction entries, wherein each depiction entry is associated with an undesirable keyword indicating one or more undesirable visual expressions of the second user;

receive, using the communications circuitry, in response to the request, the one or more undesirable depiction entries;

retrieve, from the plurality of media assets, a plurality of depictions of the second user, wherein each of the plurality of depictions is associated with a depiction keyword;

compare, for each media asset within the plurality of media assets, each depiction keyword associated with each of the plurality of depictions with each undesirable keyword associated with each of the one or more undesirable depiction entries;

determine, based on the comparing, whether any of the one or more undesirable depiction entries match any depiction of the plurality of depictions;

in response to determining that any of the one or more undesirable depiction entries match any depiction of the plurality of depictions, store an indication of each depiction of the plurality of depictions that matches any of the one or more undesirable depiction entries; and generate a notification to the second user indicating that one or more depictions of the second user in the plurality of media assets match the one or more undesirable depiction entries.

11. The system of claim 10, wherein the control circuitry is further configured, when transmitting the request, to the remote server, for the one or more undesirable depiction entries, to:

retrieve a user identifier associated with the second user;

generate a query for the one or more undesirable depiction entries, wherein the query includes the user identifier; and transmit the query to the remote server.

12. The system of claim 10, wherein the control circuitry is further configured, when receiving, in response to the request, the one or more undesirable depiction entries, to receive a data structure comprising the one or more undesirable depiction entries and each associated undesirable keyword.

13. The system of claim 12, wherein the control circuitry is further configured, when retrieving, from the plurality of media assets, the plurality of depictions of the second user, to extract, using an image analysis algorithm, one or more depiction keywords associated with each depiction of the plurality of depictions.

14. The system of claim 10, wherein the control circuitry is further configured, when determining, based on the comparing, whether any of the one or more undesirable depiction entries match any depiction of the plurality of depictions, to determine, based on comparing each keyword of the one or more media asset depiction keywords with each keyword of the one or more depiction entry keywords, whether one or more entry depiction keywords match one or more media asset depiction keywords.

15. The system of claim 10, wherein the control circuitry is further configured to:

retrieve a pre-determined action that the second user indicated to be performed in response to determining that one or more depictions of the second user in the plurality of media assets match the one or more undesirable depiction entries; and perform the pre-determined action on each depiction of the plurality of depictions that matches any of the one or more undesirable depiction entries.

16. The system of claim 10, wherein the control circuitry is further configured to:

determine whether the second user indicated one or more pre-determined actions to be performed based on determining that a depiction of the plurality of depictions matches any of the one or more undesirable depiction entries; and in response to determining that the second user did not indicate the one or more pre-determined actions to be performed, generate for display one or more actions that the second user may select to be performed.

17. The system of claim 10, wherein the control circuitry is further configured, when storing an indication of each depiction of the plurality of depictions that matches any of the one or more entries, to:

determine whether a first depiction of the plurality of depictions that matches a first entry of the one or more undesirable depiction entries is associated with a media asset comprising video;

in response to determining that the first depiction of the plurality of depictions that matches a first depiction entry of the one or more undesirable depiction entries is associated with a media asset comprising video, identify a set of depictions in the media asset comprising video, wherein each depiction in the set matches the one or more undesirable depiction entries; and store, in a data structure for each depiction in the set of depictions, a start time of the depiction within the video, an end time of the depiction within the video, and an identifier of a matching depiction entry of the one or more undesirable depiction entries.

18. The system of claim 10, wherein the control circuitry is further configured, when receiving, in response to the request, the one or more undesirable depiction entries, to receive one or more identifiers, wherein each of the one or more identifiers is associated with a pre-defined undesirable depiction.

19. The method of claim 1, wherein the one or more undesirable visual expressions of the second user comprise at least one of:

a depiction of the second user making a specific facial expression;

a depiction of the second user holding a specific object; and a depiction of the second user engaging in a specific action.

20. The system of claim 10, wherein the one or more undesirable visual expressions of the second user comprise at least one of:

a depiction of the second user making a specific facial expression;

a depiction of the second user holding a specific object; and a depiction of the second user engaging in a specific action.

* * * * *